United States Patent
Yu et al.

(10) Patent No.: US 8,466,974 B2
(45) Date of Patent: Jun. 18, 2013

(54) APPARATUS AND METHODS FOR CONTROLLING IMAGE SENSORS

(75) Inventors: Xiaoguang Yu, Wuhan (CN); Xinsheng Peng, Wuhan (CN); Hongxiao Zhao, Wuhan (CN); Rui Chen, Chengdu (CN)

(73) Assignee: O2Micro, Inc., Santa Clara, CA (US)

( * ) Notice: Subject to any disclaimer, the term of this patent is extended or adjusted under 35 U.S.C. 154(b) by 468 days.

(21) Appl. No.: 12/487,904

(22) Filed: Jun. 19, 2009

(65) Prior Publication Data

US 2010/0118169 A1    May 13, 2010

Related U.S. Application Data

(60) Provisional application No. 61/198,921, filed on Nov. 12, 2008.

(51) Int. Cl.
*H04N 5/232* (2006.01)

(52) U.S. Cl.
USPC ............... 348/211.6; 348/211.14; 348/211.5

(58) Field of Classification Search
USPC ............................................ 348/211.4–211.6
See application file for complete search history.

(56) References Cited

U.S. PATENT DOCUMENTS

| | | | |
|---|---|---|---|
| 5,920,342 A | 7/1999 | Umeda et al. | |
| 6,496,361 B2 | 12/2002 | Kim et al. | |
| 6,670,984 B1 * | 12/2003 | Tanaka et al. | 348/159 |
| 7,369,160 B2 * | 5/2008 | Fujino et al. | 348/211.3 |
| 7,535,490 B2 | 5/2009 | Aizawa | |
| 7,602,419 B2 * | 10/2009 | Kiuchi | 348/211.1 |
| 7,917,602 B2 | 3/2011 | Sweatt, III et al. | |
| 2005/0083411 A1 | 4/2005 | Cozier et al. | |
| 2006/0026304 A1 * | 2/2006 | Price | 710/8 |
| 2006/0044394 A1 * | 3/2006 | Read | 348/207.1 |
| 2008/0036913 A1 | 2/2008 | Yeh et al. | |
| 2008/0109889 A1 | 5/2008 | Bartles | |
| 2008/0198544 A1 * | 8/2008 | Schenk | 361/684 |

FOREIGN PATENT DOCUMENTS

| | | |
|---|---|---|
| CN | 101184167 A | 5/2008 |
| CN | 101409741 A | 4/2009 |
| JP | H08-88785 | 4/1996 |
| JP | 2004-128728 | 4/2004 |
| JP | 2008-513058 | 5/2008 |
| TW | 445744 B | 7/2001 |
| TW | 540238 B | 7/2003 |
| TW | 200809523 A | 2/2008 |
| TW | 20084992 A | 12/2008 |
| WO | 2006/032013 | 3/2006 |

OTHER PUBLICATIONS

English language abstract corresponding to JP. 2004-128728.
Translation of Office Action received in Japan Application No. 2009-241405 dated Nov. 30, 2010.
English Translation for Abstract of CN 101184167A.

* cited by examiner

*Primary Examiner* — Anthony J Daniels

(57) ABSTRACT

A computer-implemented method for controlling an image sensor includes loading an image file having data sets associated with multiple image sensors respectively, identifying the image sensor if identification data included in one of the data sets matches to the image sensor, and configuring the image sensor according to configuration data included in the data set matching to the image sensor. The identification data indicates an identity of the image sensor. The configuration data indicates operation parameters of the image sensor.

14 Claims, 3 Drawing Sheets

APPARATUS AND METHODS FOR CONTROLLING IMAGE SENSORS

RELATED APPLICATION

This application claims priority to U.S. Provisional Application No. 61/198,921, filed on Nov. 12, 2008, which is hereby incorporated by reference in its entirety.

BACKGROUND

In recent years, electronic devices with image acquisition functions have become popular with consumers. Typically, a camera module employed in an electronic device, e.g., a personal computer or a cell phone, includes an image sensor that captures incident light to form an electronic representation of an image. That is, the image sensor is a semiconductor device that converts optical image signals into electrical image signals. The electronic device may not configure the image sensors properly as various types of image sensors need different settings. Moreover, the camera module usually includes an electrically erasable programmable read-only memory ($E^2PROM$) to store configuration data of the image sensor. However, cost of the camera module can be increased by the adoption of the $E^2PROM$.

SUMMARY

In one embodiment, a computer-implemented method for controlling an image sensor includes loading an image file having data sets associated with multiple image sensors respectively, identifying the image sensor if identification data included in one of the data sets matches to the image sensor, and configuring the image sensor according to configuration data included in the data set matching to the image sensor. The identification data indicates an identity of the image sensor. The configuration data indicates operation parameters of the image sensor.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Figure 1:
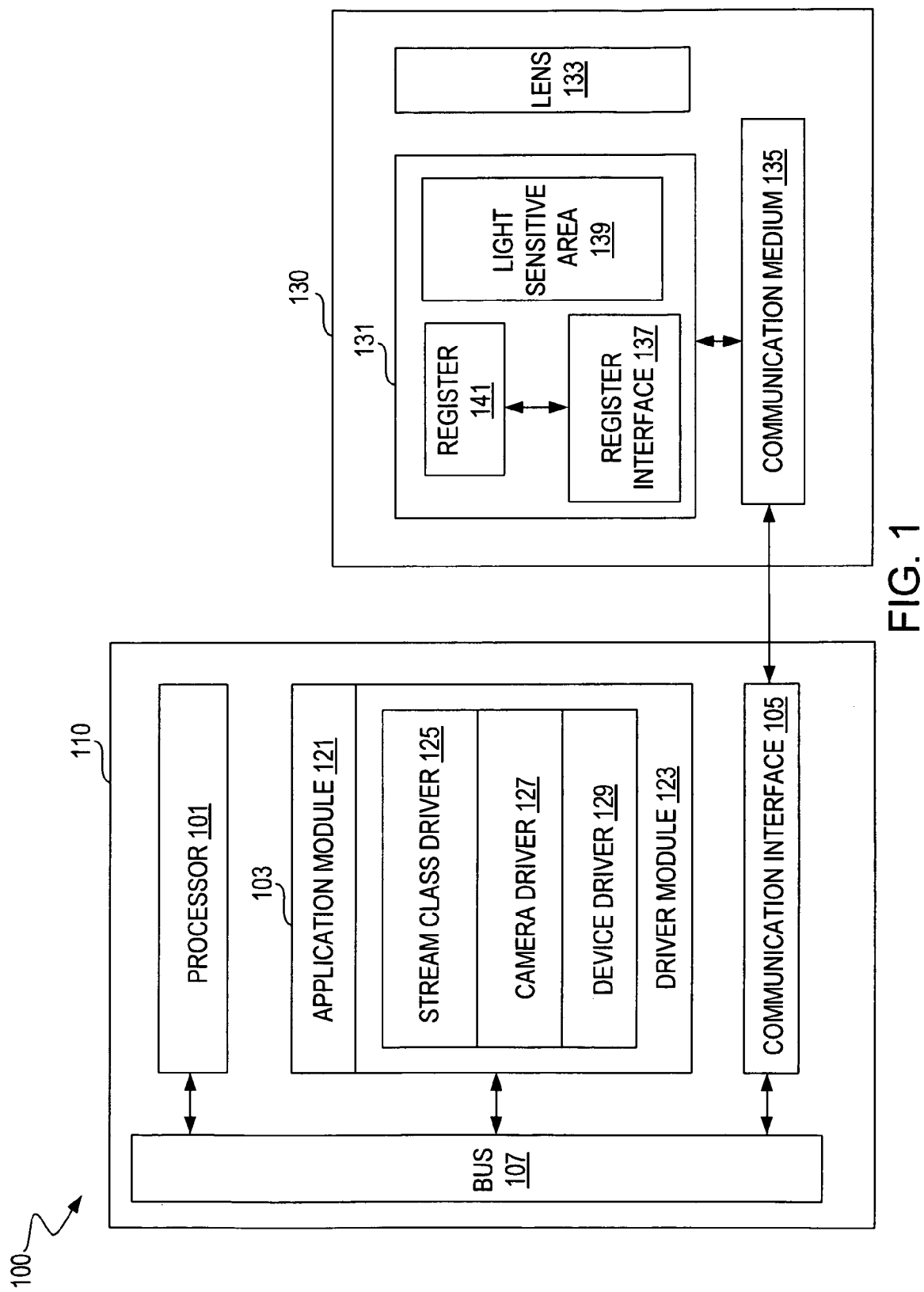
FIG. 1 is a block diagram of a camera system according to one embodiment of the invention.

Reference will now be made in detail to embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "loading," "accessing," "identifying," "configuring," "updating," "determining," "acquiring," "requesting," "invoking," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

FIG. 1 illustrates a block diagram of a camera system 100 according to one embodiment of the invention. The camera system 100 includes a computer unit 110 and a camera module 130, in one embodiment. The computer unit 110 can control the camera module 130 to capture optical images and can receive electrical signals representing the captured images from the camera module 130. The computer unit 110 can be a cell phone, a personal computer, a workstation, or the like.

In one embodiment, the camera module 130 includes an image sensor 131, a lens 133, and a communication medium 135. The lens 133 can focus incoming light onto the image sensor 131. The image sensor 131 can capture optical image signals and can convert the optical image signals to analog electrical image signals. Furthermore, the image sensor 131 can convert the analog electrical image signals to digital raw image signals (e.g., digital images in a RAW format), in one embodiment. The image sensor 131 can be, but is not limited to, a charge-coupled device (CCD) image sensor or a complementary metal-oxide-semiconductor (CMOS) active-pixel sensor. In one embodiment, the image sensor 131 can include a register interface 137, a light sensitive area 139, and one or more registers 141. To distinguish image sensors of various types from each other, each type of the image sensors is allocated with a unique identification value. The identification value can be stored in one or more registers 141. Moreover, the registers 141 can store configuration data, thereby determining operation parameters of the image sensor 131, in one embodiment. The operation parameters can include, but are not limited to, resolution, brightness, contrast, exposure method, and exposure time of the image sensor 131. The light sensitive area 139 senses the incident light to generate the analog electrical image signals.

The communication medium 135 can transfer control commands from the computer unit 110 to control an image acquisition function of the image sensor 131, e.g., to set or adjust operation parameters of the image sensor 230. The communication medium 135 can interface with the computer unit 110 according to a communication protocol such as a universal serial bus (USB) protocol or a 1394 protocol, etc. Furthermore, the communication medium 135 can interface with the image sensor 131 according to another communication protocol, such as an inter-integrated circuit ($I^2C$) bus protocol or a serial camera control bus (SCCB) protocol. In other words, the image sensor 131 can support $I^2C$/SCCB protocol, in one embodiment. As such, the communication medium 135 also provides a protocol conversion, e.g., between USB and $I^2C$/SCCB. In addition, the communication medium 135 can transfer the digital image signals (e.g., digital raw image signals) from the image sensor 131 to the computer unit 110. The communication medium 135 can access the registers 141 via the register interface 137 according to the SCCB/$I^2C$ protocol.

In one embodiment, the computer unit 110 includes a processor 101 (e.g., a central processing unit), a memory (storage device) 103, a communication interface 105, and a bus 107. An operation system, e.g., windows XP, windows Vista and Linux, is installed into the computer unit 110. In one embodiment, the processor 101 processes instructions of various programs stored in the memory 103 to send commands to corresponding hardware elements. To run a particular program, the processor 101 loads the related instructions from the memory 103 and sends corresponding control commands to associated hardware elements to execute such instructions. The processor 101 can also send commands to control a device coupled to the computer unit 110, e.g., the camera 130, according to the instructions. Furthermore, the memory 103 is a computer-readable medium and can store computer-readable and/or computer-executable data, which can be processed by the processor 101. The communication interface 105 can include a serial interface, a parallel interface, and/or other types of interfaces, and is capable of sending and receiving electrical, electromagnetic or optical signals that carry digital data streams. For example, the communication interface 105 interfaces with the communication medium 135 to transfer the electrical image signals and control commands regarding image acquisition management. Communications among hardware elements of the computer unit 110, e.g., the processor 101, the memory 103, and the communication interface 105, are established via the bus 107.

The memory 103 can include an application module 121 and a driver module 123, in one embodiment. The application module 121 can include user-mode programs which run in foreground and interact with users. The driver module 123 can include kernel-mode programs which run in background and are invisible to the users. In one embodiment, the driver module 123 includes a stream class driver 125, a camera driver 127, and a device driver 129. The application module 121 and the driver module 123 can be executed by the processor 101.

In one embodiment, the stream class driver 125 can be provided by the operation system and serve as a bridge linking the upper level user-mode programs and the lower level kernel-mode programs. For example, if a user starts a video call function of a user-mode program, the user-mode program can issue an image request. The stream class driver 125 will receive the image request and invoke the camera driver 127 to start the camera module 130 in response to the image request. The camera driver 127 is developed for driving image sensors of various types. Even if the camera module 130 replaces the image sensor 131 with a different type of image sensor, the camera driver 127, without updating, can still identify and configure the newly employed image sensor, in one embodiment. In other words, the camera driver 127 is a universal driver for various image sensors. Furthermore, the camera driver 127 invokes the device driver 129 to establish communications between the communication interface 105 and the communication medium 135, thereby enabling communications between the computer unit 110 and the image sensor 131. For example, the device driver 129 can be executed by the processor 101 to detect/recognize signals, e.g., digital raw image signals, from the image sensor 131, and to translate such signals from the image sensor 131 to corresponding computer-readable data. In addition, the device driver 129 can translate the computer-readable data, e.g., computer commands from the computer unit 110, into sensor-readable signals. In one embodiment, the device driver 129, e.g., a USB driver, can be provided by the operation system.

Advantageously, the camera driver 127 can support various image sensors, therefore making the camera system 100 more flexible and user-friendly. Furthermore, $E^2PROM$ is eliminated from the camera module 130. Therefore, cost of the camera system 100 can be reduced.

Figure 2:
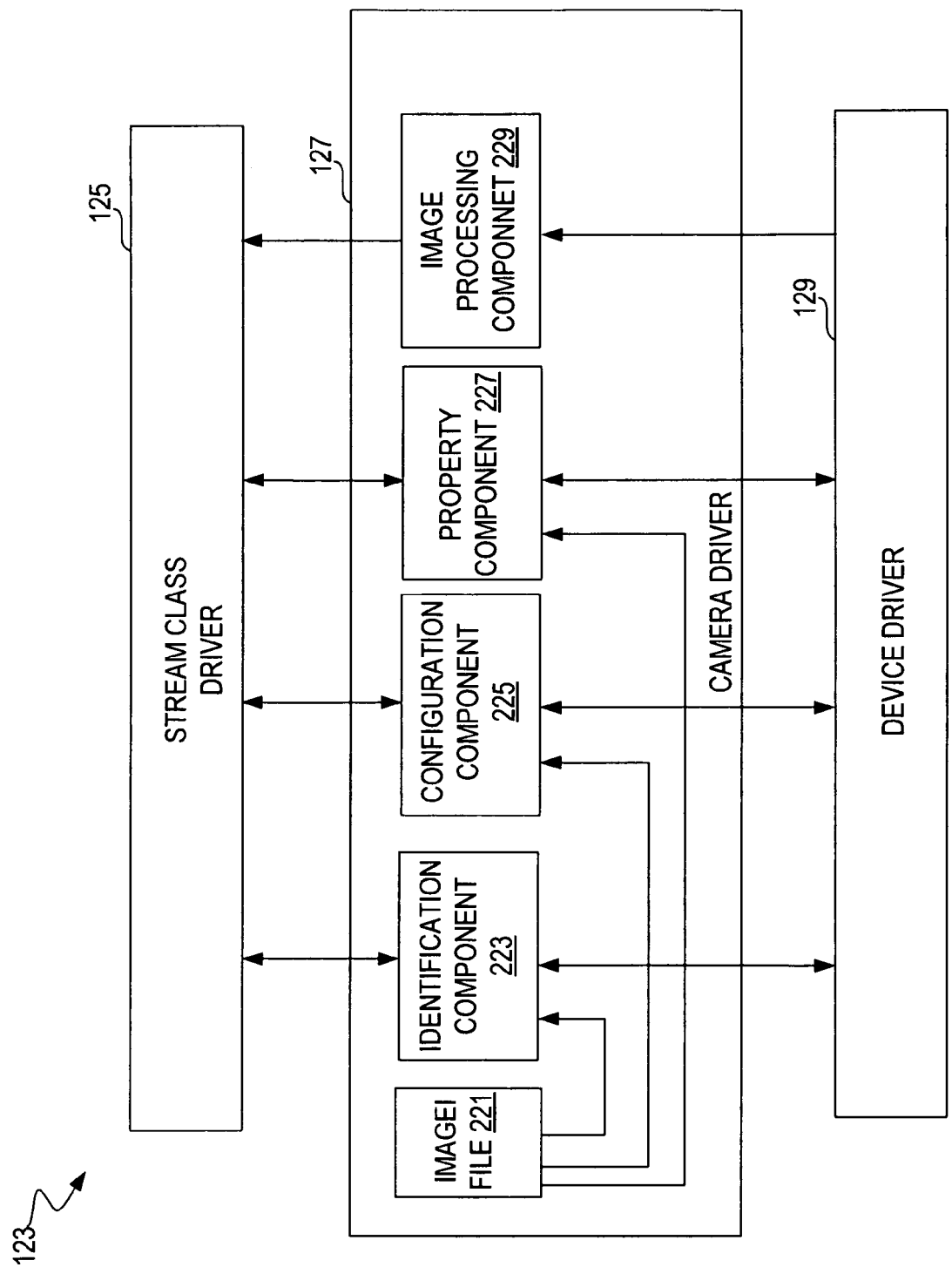
FIG. 2 is a block diagram of a driver module according to one embodiment of the present invention.

FIG. 2 illustrates a block diagram of the driver module 123 according to one embodiment of the present invention. Elements labeled the same in FIG. 1 have similar functions. FIG. 2 is described in combination with FIG. 1. In one embodiment, the camera driver module 127 further includes an image file 221, an identification component 223, a configuration component 225, a property component 227, and an image processing component 229.

The image file 221 stores computer-readable data sets associated with different image sensors. In one embodiment, each of the data sets defines identification data and configuration data associated with a corresponding image sensor. The identification data indicates a sensor type (or an identity) of the corresponding image sensor. For example, the identification data of the image sensor 131 can include the identification value as mentioned in relation to FIG. 1, one or more address values, and an address count value. The address values indicate the addresses of the registers 141. The address count value indicates the number of the registers 141 for storing the identification value. By way of example, if the identification value is 16-bit long, the identification value can be stored in two 8-bit registers. Thus, the address values include the addresses of the two 8-bit registers and the address count value is 2. In the following description, the identification value stored in the image file 221 is named as the local identification value, and the identification value stored in the registers 141 is named as the remote identification value. In one embodiment, the identification data of the image sensor 131 can also include a protocol value indicating the communication protocol (e.g., the I²C protocol and the SCCB protocol) supported by the image sensor 131. The corresponding configuration data indicate operation parameters of the image sensor 131, such as resolution, brightness, contrast, and exposure method and exposure time.

Advantageously, the image file 221 can be updated to include additional data sets associated with the image sensors unknown to the computer unit 110. For example, data sets associated with new image sensors can be written into the image file 221 to make such image sensors recognizable by the camera driver application 127. As such, the camera driver application 127 can be customized to support various arbitrary image sensors.

The identification component 223 executed by the processor 101 can compare the remote identification value in the image sensor 131 (e.g., the remote identification value stored in the registers 141) to the local identification values contained in the data sets in the image file 221. The image sensor 131 can be identified if the local identification value contained in one of the data sets matches to the remote identification value. More specifically, the identification component 223 includes computer-executable instruction codes for acquiring the remote identification value of the image sensor 131 (by way of example) according to the address values and the address count value contained in a corresponding data set, and for identifying the image sensor 131 automatically by comparing the remote identification value to the local identification values contained in the corresponding data set. The configuration component 225 includes computer-executable instruction codes for reading the configuration data contained in the corresponding data set, and for setting the operation parameters of the image sensor 131 according to the corresponding configuration data.

The image processing component 229 includes computer-executable instruction codes for performing a digital graphic processing on the digital image signals from the camera module 130. More specifically, the image processing component 229 can adjust the image attributes, e.g., brightness, color, saturation, and noise-signal ratio of the digital image signals by various digital processing algorithms such as geometric transformation, color processing, image composite, image denoising, and image enhancement. As a result, the digital raw image signals can be converted into color-corrected images with a standard image file format, e.g., a join photographic experts group (JPEG) standard.

In one embodiment, the data sets stored in the image file 221 can further define property data indicating the image attributes, e.g., the brightness, color, saturation, and noise-signal ratio of the digital image signals. The property component 227 includes computer-executable instruction codes for adjusting image attributes of the digital image signals. If the user-mode programs issue requests for adjusting the image attributes, the property component 227 can read the property data from the image file 227 and adjust the image attributes accordingly.

In one embodiment, the camera driver module 127 includes a determining component and an updating component. The determining component includes computer-executable instruction codes for determining the communication protocol supported by the image sensor 131 and whether a successful communication with the image sensor 131 has been established. The updating component includes computer-executable instruction codes for updating the image file 221 if none of the data sets includes the identification data matching to the image sensor 131.

Figure 3:
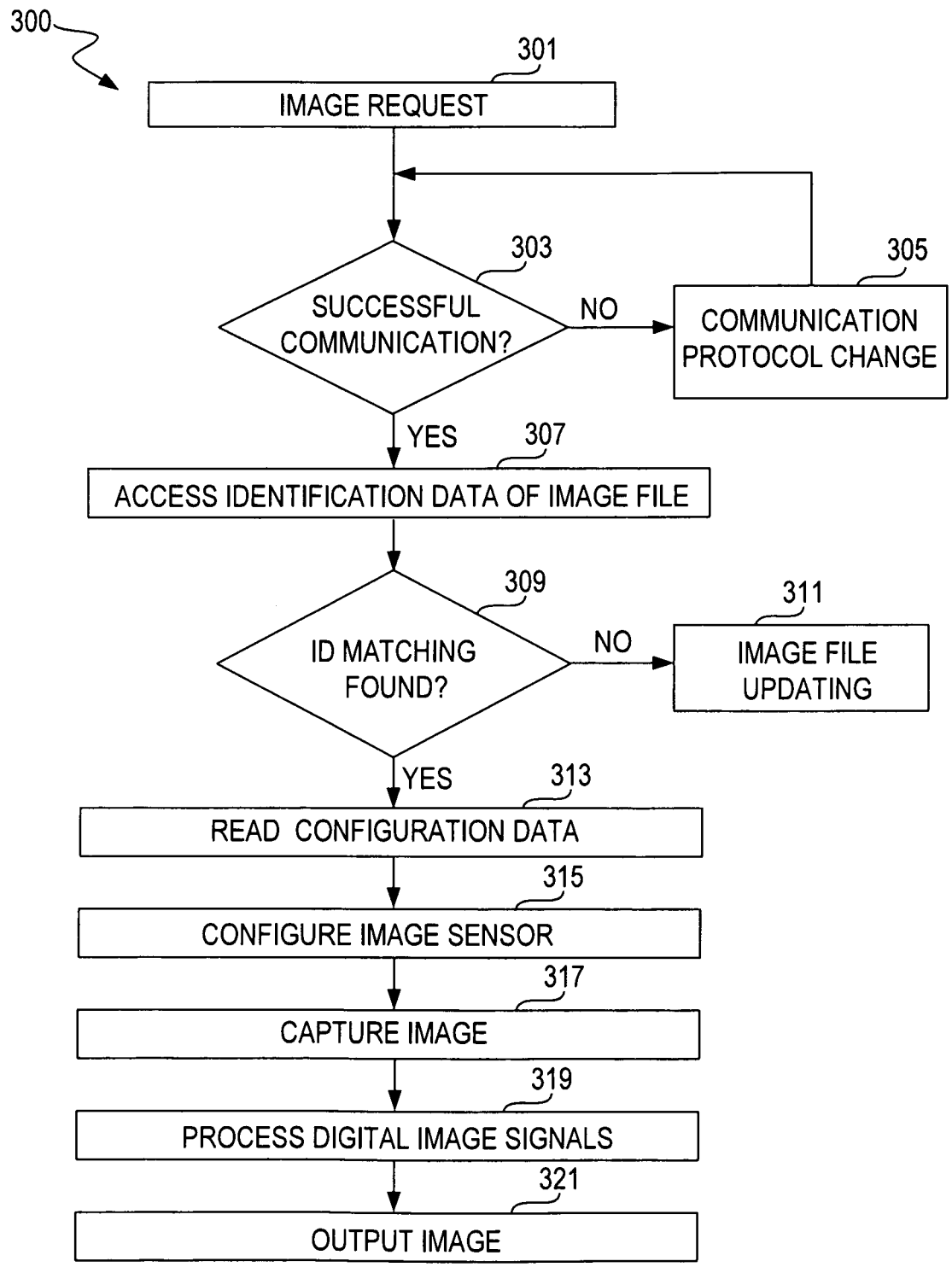
FIG. 3 is a flowchart of a method for controlling an image sensor according to one embodiment of the present invention.

FIG. 3 illustrates a flowchart 300 of a method for controlling an image sensor according to one embodiment of the present invention. Although specific steps are disclosed in FIG. 3, such steps are exemplary. That is, the present invention is well suited to performing various other steps or variations of the steps recited in FIG. 3. FIG. 3 is described in combination with FIG. 1 and FIG. 2. In one embodiment, the flowchart 300 is implemented as computer executable-instructions stored in a computer-readable medium.

At step 301, an image request is issued by a user-mode program, e.g., a video application program. In response to the image request, the stream class driver 125 invokes the camera driver 127 which is therefore loaded from the memory 103 and processed by the processor 101, along with the image file 221. The tasks programmed in the camera driver 127 can be executed accordingly. The tasks will be described in detail in the following descriptions regarding step 303 through step 321.

At step 303, the determining component of the camera driver 127 determines whether a successful communication with the image sensor 131 has been established. For example, assuming that the communication protocol supported by the image sensor 131 is I²C and the communication interface 105 uses the USB protocol to interface with the communication medium 135, the successful communication can not be set up if the communication medium 135 conducts a USB to SCCB protocol conversion. In this instance, the SCCB protocol is changed to the I²C protocol, and the communication medium 135 executes the USB to I²C protocol conversion at step 305. Following the communication protocol change at step 305, step 303 is executed again to determine that the successful communication has been established. By now, the communication protocol supported by the image sensor 131 is determined.

Alternatively, the protocol value of the identification data can be used as a default communication protocol in communication establishment at step 303. That is, the protocol value is assumed as the communication protocol by the determining component of the camera driver 127 in the first trial of communication establishment. By using the protocol value as the default communication protocol, the possibility of successful communication establishment in the first trial is increased. As such, system efficiency is enhanced.

At step 307, the identification data stored in the image file 221 are accessed. For the identification data of each data set, an identifying component of the camera driver 127 determines whether an ID matching is found at step 309. More specifically, an acquiring component of the camera driver 127 reads the remote identification value of the image sensor 131 from the registers 141 according to the address values and the address count value of the identification data. The identifying component compares the remote identification value of the image sensor 131 with the local identification value of the identification data to make the determination. The acquiring component and the identifying component constitute the identification component 223, in one embodiment. If the remote and local identification values are identical, the ID matching is found. In this instance, the corresponding configuration data is read at step 313 and the image sensor 131 is configured at step 315. If the ID matching is not found after comparing the identification values in all the data sets in the image file 221 to the remote identification value, the image file 221 can be updated at step 311 to include an additional data set associated with the unknown image sensor 131.

At step 317, the image sensor 131 captures the optical images and generates digital image signals according to the configured operation parameters. At step 319, the digital image signals are processed to generate color-corrected images. At step 321, the color-corrected images are transmitted to the user-mode program via the stream class driver 125 for display.

In summary, embodiments in accordance with the present disclosure provide a universal camera driver which can support various image sensors and therefore making the camera system more flexible and user-friendly. Furthermore, one or more parts (e.g., the E²PROM) can be eliminated from the camera system and therefore the cost of the camera system can be reduced. Moreover, an image file accompanying the universal camera driver can be updated to include identification and configuration information associated with unknown image sensors. As such, the universal camera driver can be customized to support arbitrary image sensors.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A computer-implemented method for controlling an image sensor, said method comprising:
    loading an image file having a plurality of data sets associated with a plurality of image sensors respectively by a processor, wherein each of said data sets comprises identification data indicating an identity of one of said image sensors and configuration data indicating operation parameters of said one of said image sensors;
    accessing a register in said image sensor according to an address value contained in said identification data;
    acquiring a remote identification value of said image sensor from said register;
    comparing said remote identification value to a local identification value contained in said identification data;
    identifying said image sensor if said remote identification value is matched to said local identification value;
    configuring said image sensor according to said configuration data by said processor; and
    updating said image file if none of said data sets comprises said identification data matching to said image sensor by said processor so as to make said image sensor recognizable by said processor.

2. The computer-implemented method of claim 1, further comprising:
    determining a communication protocol supported by said image sensor by said processor.

3. The computer-implemented method of claim 2, wherein said communication protocol is selected from the group consisting of a serial camera control bus (SCCB) protocol and an inter-integrated circuit (I²C) bus protocol.

4. The computer-implemented method of claim 1, further comprising:
    issuing an image request by a user-mode program by said processor; and
    accessing said data sets in said image file in response to said image request by said processor.

5. The computer-implemented method of claim 1, further comprising:
    invoking a kernel-mode interface driver to communicate with said image sensor by said processor.

6. The computer-implemented method of claim 5, wherein said kernel-mode interface driver comprises a universal serial bus (USB) driver.

7. The computer-implemented method of claim 1, wherein said image sensor is selected from the group consisting of a charge-coupled device (CCD) image sensor and a complementary metal-oxide-semiconductor (CMOS) active pixel sensor.

8. A non-transitory computer-readable medium having computer-executable components for controlling an image sensor, said computer-executable components comprising:
    an image file for storing a plurality of data sets associated with a plurality of image sensors respectively, wherein each of said data sets comprises identification data indicating an identity of one of said image sensors and configuration data indicating operation parameters of said one of said image sensors;
    an identification component for accessing said data sets to identify said image sensor if said identification data matches to said image sensor;
    a configuration component for configuring said image sensor according to said configuration data; and
    an updating component for updating said image file if none of said data sets comprises said identification data matching to said image sensor so as to make said image sensor recognizable by said computer-executable components,
    wherein said identification component comprises:
        an acquiring component for acquiring a remote identification value of said image sensor according to an address value contained in said identification data; and
        an identifying component for comparing said remote identification value to a local identification value contained in said identification data and for identifying said image sensor if said remote identification value is matched to said local identification value.

9. The non-transitory computer-readable medium of claim 8, further comprising:
    a determining component for determining a communication protocol supported by said image sensor.

10. The non-transitory computer-readable medium of claim 8, further comprising:
    a user-mode program for issuing an image request, wherein said identification component accesses said data sets in response to said image request.

11. The non-transitory computer-readable medium of claim 8, further comprising:
    a kernel-mode device driver invoked for communicating with said image sensor.

12. An apparatus for controlling a plurality of image sensors, said apparatus comprising:
    a processor operable for executing a computer-executable component and for generating control commands;

a memory coupled to said processor and for storing said computer-executable component, wherein said memory stores an image file comprising a plurality of data sets associated with said image sensors respectively, wherein each of said data sets comprises identification data indicating a sensor type of a corresponding image sensor and comprises configuration data indicating said operation parameters of said corresponding said image sensor, wherein said computer-executable component comprises a universal camera driver operable for identifying said image sensors having a plurality of sensor types according to said identification data and for configuring operation parameters of said image sensors according to said configuration data, and wherein said universal camera driver comprises an acquiring component for acquiring a remote identification value of said image sensor according to an address value contained in said identification data and an identifying component for comparing said remote identification value to a local identification value contained in said identification data and identifying said image sensor if said remote identification value is matched to said local identification value; and a communication interface coupled to said processor and operable for transferring said control commands to said image sensors, wherein said image file can be updated to include additional data sets associated with additional image sensors whose sensor types are unable to be identified by said universal camera driver so as to make said additional image sensors recognizable by said universal camera driver.

13. The apparatus of claim 12, wherein said universal camera driver determines communication protocols supported by said image sensors respectively.

14. The apparatus of claim 12, wherein said image sensors comprise a CCD image sensor and a CMOS active pixel sensor.

* * * * *